(12) United States Patent
Kozhukh

(10) Patent No.: US 6,937,398 B2
(45) Date of Patent: Aug. 30, 2005

(54) HIGHLY REFLECTIVE OPTICAL COMPONENTS

(75) Inventor: Michael Kozhukh, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 09/842,935

(22) Filed: Apr. 26, 2001

(65) Prior Publication Data

US 2002/0159172 A1 Oct. 31, 2002

(51) Int. Cl.$^7$ .............................. G02B 1/10; G02B 5/08; B05D 5/06
(52) U.S. Cl. .................. 359/584; 359/585; 359/359; 359/582; 359/885; 427/167; 428/428
(58) Field of Search .................. 359/584, 585, 359/586, 582, 580, 359, 360, 885, 224, 230, 231; 430/5; 257/431, 432; 427/167; 428/428, 698; 369/112; 438/619

(56) References Cited

U.S. PATENT DOCUMENTS

| | | | |
|---|---|---|---|
| 5,619,059 A | * | 4/1997 | Li et al. ..................... 257/431 |
| 5,774,783 A | * | 6/1998 | Kaitsu et al. ............... 428/546 |
| 6,052,217 A | | 4/2000 | Hwang |
| 6,078,425 A | | 6/2000 | Wolfe et al. |
| 6,134,207 A | * | 10/2000 | Jerman et al. ............... 369/112 |
| 6,261,943 B1 | * | 7/2001 | Grupp ......................... 438/619 |
| 6,284,393 B1 | * | 9/2001 | Hosokawa et al. ......... 428/690 |
| 6,572,990 B1 | * | 6/2003 | Oyama et al. .............. 428/698 |
| 6,587,263 B1 | * | 7/2003 | Iacovangelo et al. ....... 359/359 |

FOREIGN PATENT DOCUMENTS

| | | |
|---|---|---|
| EP | 0 632 294 A1 | 1/1995 |
| WO | WO 00/54090 | 9/2000 |

OTHER PUBLICATIONS

"Thin Film Optical Coating" Macleod, McGrew–Hill, 1986 pp. 95–100.*

* cited by examiner

Primary Examiner—Audrey Chang
(74) Attorney, Agent, or Firm—Trop, Pruner & Hu, P.C.

(57) ABSTRACT

Optical components may be made with reflectors that increase the reflectivity of the resulting device. Increasing in the reflectivity may reduce the need for higher power light sources. In particular, the use of deposited silver layers may dramatically increase the reflectivity compared to aluminum and copper alloys. In addition, an absorptive layer may be positioned over the reflective layer to reduce the amount of blue light output from the reflector. This blue light absorber may be used to automatically rebalance light sources that produce an excessive proportion of blue light.

12 Claims, 3 Drawing Sheets

HIGHLY REFLECTIVE OPTICAL COMPONENTS

This invention relates generally to precision optical components which are highly reflective.

Highly reflective mirrors are needed in a variety of microelectronic applications. For example, liquid crystal over silicon (LCoS) light modulators are utilized in microdisplays and projectors. In many cases, the reflectivity of these mirrors defines the performance of the overall display or projector. The poorer the reflectivity of the mirrors, the more light must be utilized to illuminate a display screen or a display as the case should be. If more light is not available, which is commonly the case, then the resulting image is simply washed out.

A micromirror functions to reflect incident light. Its ability to reflect light with an appropriate light spectra defines the quality of the resulting image. Moreover, the micromirror's ability to reflect light also affects a number of other optical components including the available spectra, the available power, and the temperature of silicon memory, as well as liquid crystal and optical components. As a result, the stability of many devices may be determined by the quality of the mirrors. Mirrors with relatively lower light reflectivity may require higher power lamps increasing the temperature of all display elements.

As a result, display vendors are trying to develop micromirrors with the highest possible light reflectivity. Nonetheless, the best reflectivity reported to date is in the lower ninety percent reflectivity, using aluminum or aluminum plus 0.5% copper mirrors.

Thus there is a need for better performing reflectors for use in higher performance optical components.

DETAILED DESCRIPTION

Figure 1:
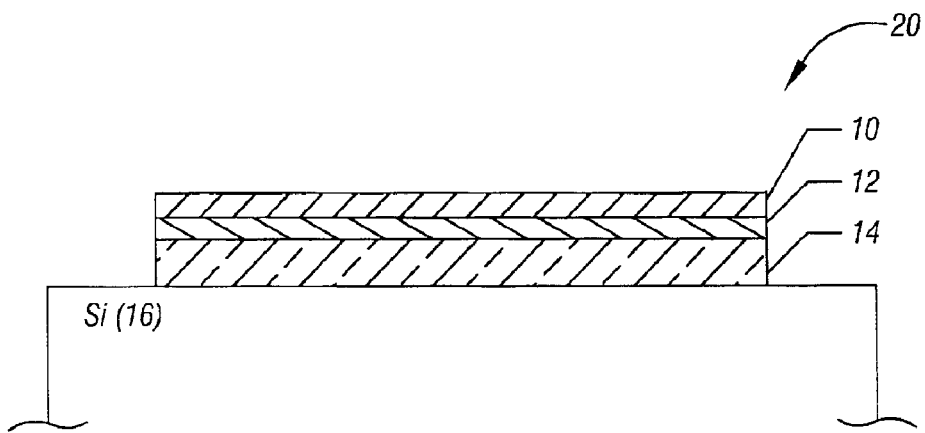
FIG. 1 is an enlarged, cross-sectional view of one embodiment of the present invention.

Referring to FIG. 1, a silicon wafer or other substrate 16 may be coated with a layer 14 of silver, a layer 12 of silicon dioxide and a layer 10 of silicon nitride. The layer 14 provides high reflectivity. The layers 10 and 12 may provide isolation from liquid crystal materials in those applications where it is desired to separate the reflective material from a liquid crystal material.

The silver layer 14 may be deposited by direct current or dc-sputtering on the surface of a polished silicon wafer at a substrate temperature not higher than 50° C. In the illustrated embodiment, pure silver is utilized for the layer 14. While generally the use of silver is avoided in semiconductor processes, the deleterious effect of silver on silicon may be substantially lessened by depositing the silver at low temperature.

In one embodiment, each of the layers 10 and 12 may have a thickness of about 700 to about 750 Angstroms. Advantageously, the layers 10 and 12 are deposited using chemical vapor deposition techniques at temperatures not higher than 250° C. The use of relatively low temperature deposition techniques (normal deposition techniques may involve temperatures of 400° C.) may be effective to form layers with relatively small grain sizes.

Figure 2:
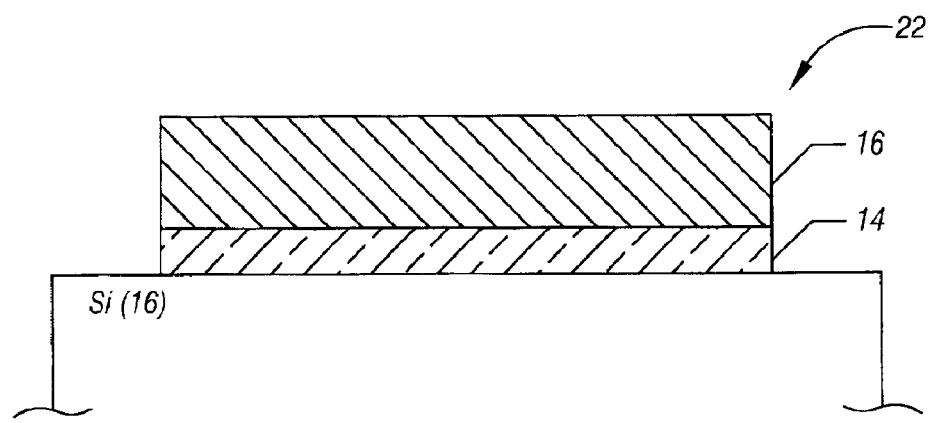
FIG. 2 is an enlarged, cross-sectional view of another embodiment of the present invention.

In FIG. 2, the layers 10 and 12 of FIG. 1 are replaced by a thicker layer 16 of silicon dioxide. The layer 12 in FIG. 2 can be formed of a thickness of approximately 3000 Angstroms using chemical vapor deposition techniques and temperatures not higher than 250° C. in one embodiment.

Figure 3:
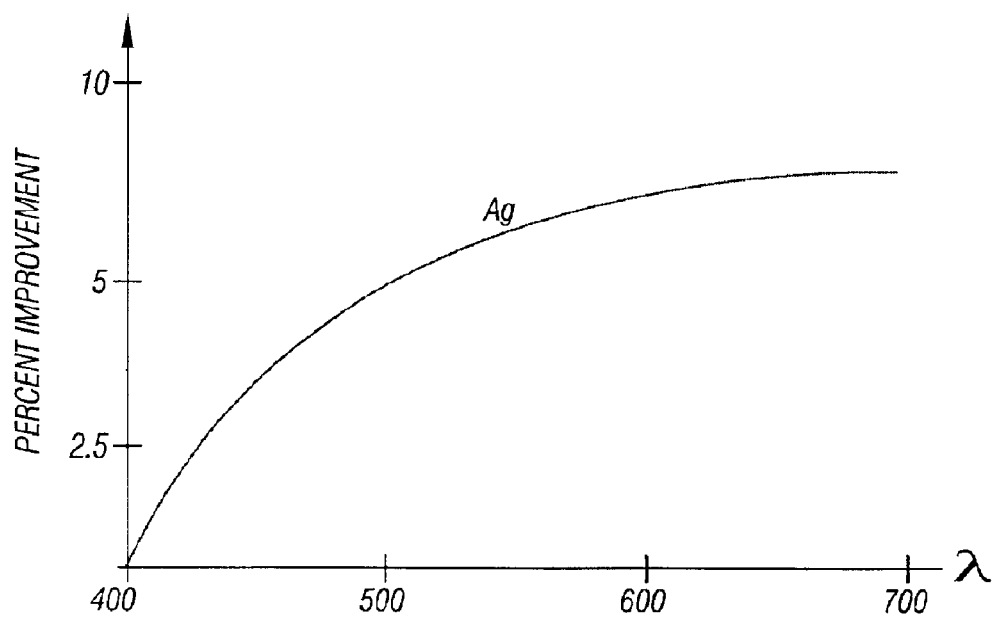
FIG. 3 is idealized representation of the percent improvement in reflectivity of a silver reflector compared to an aluminum plus 0.5% copper reflector over the visible wavelength spectra.

The inventor of the present invention has determined that the use of silver as a reflector is highly advantageous compared to the use of aluminum and particularly to the use of aluminum plus 0.5% copper. The use of aluminum plus copper has been credited with achieving the highest commercially available reflectivities on the order of ninety percent. As shown in FIG. 3, a significant reflectivity improvement, on a percentage basis, can be achieved using silver compared to aluminum plus copper.

Figure 4:
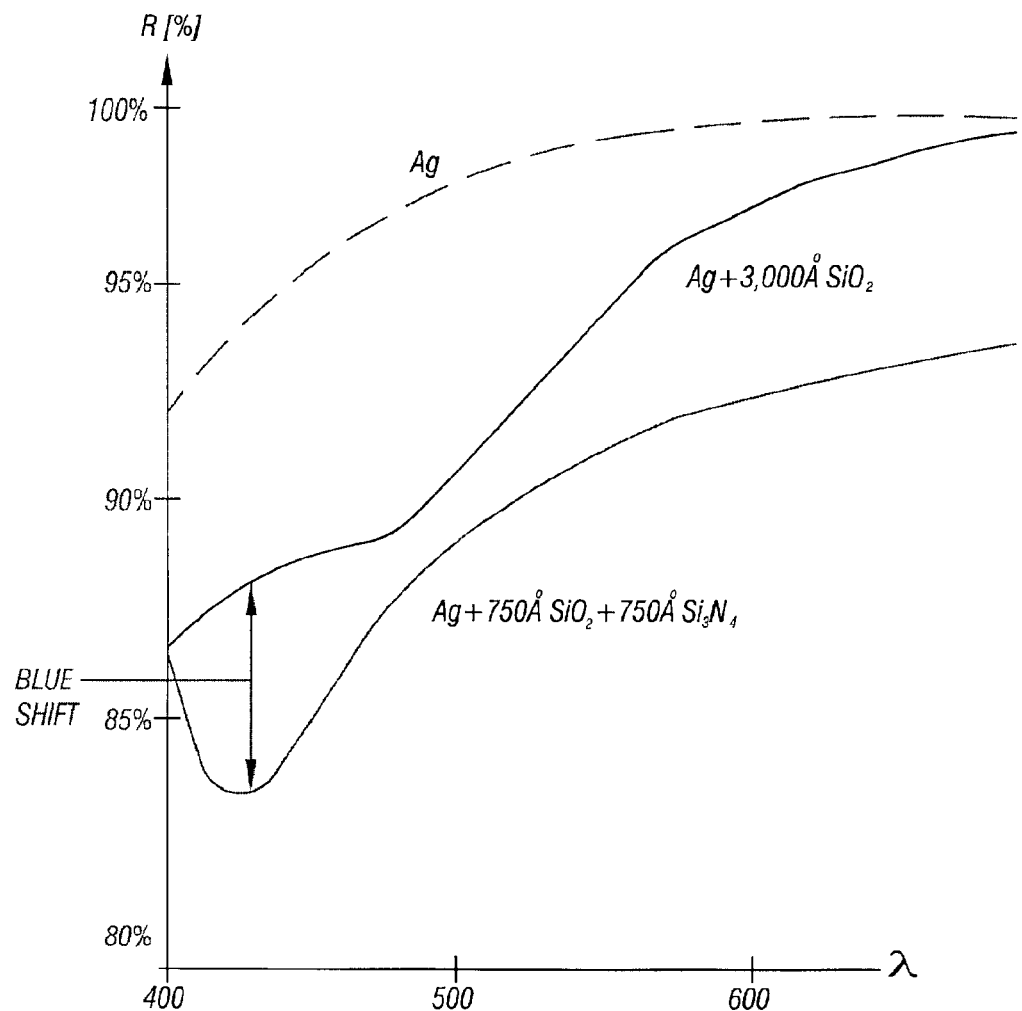
FIG. 4 is a graph of percent reflectivity versus wavelength for a plurality of different silver containing reflective surfaces in accordance with embodiments of the present invention.

Referring next to FIG. 4, as would be expected, coating the silver films with silicon dioxide or silicon dioxide plus silicon nitride, decreases the reflectivity of the resulting composite. However, this may be necessary in some applications involving liquid crystal materials. What is more interesting though is the blue shift that occurs when using silver covered by 750 Angstroms of silicon dioxide and 750 Angstroms of silicon nitride.

The peculiar drop in the reflectivity of blue light is particularly noticeable compared to the results for silver covered by 3000 Angstroms of silicon dioxide. Clearly, the inclusion of silicon nitride in the overcoating has a dramatic (negative) effect on the reflection of blue light. In addition, the use of two relatively thin insulator layers with relatively small grain sizes may contribute to the blue shift.

Reducing the reflection of blue light, in particular, from a reflective surface may be advantageous in many applications. For example, many lamps utilized in connection with projection displays over produce blue light relative to other visible light wavelengths. In other words, the light produced has a spectra that includes more blue light than normal ambient light. This imbalance may be corrected by using a reflector that produces a blue shift. The result of using a reflector including a coating of silicon nitride may be to reduce the amount of reflected blue light and to thereby automatically rebalance the spectra of the lamp or light source.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A reflector comprising:

a reflective layer; and an absorbing layer to selectively absorb blue light, said absorbing layer being located over said reflective layer, said absorbing layer including about 700 to about 750 Angstroms of silicon dioxide and about 700 to about 750 Angstroms of silicon nitride.

2. The reflector of claim 1 wherein said reflector is a micromirror.

3. The reflector of claim 1 wherein said reflective layer is formed of silver, said silver being formed over a polished semiconductor material.

4. A method comprising:

forming a reflective layer; and forming an absorbing layer, including an oxide layer and a nitride layer, each of a thickness of about 700 Angstroms to about 750 Angstroms, over said reflective layer at a temperature of less than 250° C. so that said layers selectively absorb blue light.

5. The method of claim 4 including forming the reflective layer by depositing silver directly on a semiconductor layer.

6. The method of claim 5 including forming said silver layer at a temperature of 50° C. or less.

7. The method of claim 4 including forming an absorbing layer including a layer of two different insulator materials.

8. The method of claim 4 including forming said absorbing layer using chemical vapor deposition.

9. A reflector comprising:

a silicon substrate;

a silver layer formed directly on said silicon substrate; and an absorbing layer over said silver layer, said absorbing layer including about 700 to 750 Angstroms of silicon dioxide and from 700 to about 750 Angstroms of silicon nitride, said absorbing layer selectively absorbing blue light.

10. The reflector of claim 9 wherein said reflector is a micromirror.

11. The reflector of claim 9 wherein said silver layer is formed at a temperature below 50° C.

12. The reflector of claim 9 wherein said absorbing layer is formed at a temperature below 250° C.

* * * * *